(12) United States Patent
Winter et al.

(10) Patent No.: US 7,818,785 B2
(45) Date of Patent: Oct. 19, 2010

(54) SYSTEM AND METHOD FOR SECURE INFORMATION HANDLING SYSTEM MEMORY

(75) Inventors: Robert Winter, Leander, TX (US); Travis L. Hart, Jr., Austin, TX (US)

(73) Assignee: Dell Products L.P., Round Rock, TX (US)

( * ) Notice: Subject to any disclaimer, the term of this patent is extended or adjusted under 35 U.S.C. 154(b) by 686 days.

(21) Appl. No.: 11/782,869

(22) Filed: Jul. 25, 2007

(65) Prior Publication Data

US 2009/0031414 A1    Jan. 29, 2009

(51) Int. Cl.
*H04L 9/32* (2006.01)
*G06F 9/00* (2006.01)

(52) U.S. Cl. .................. 726/2; 726/3; 726/15

(58) Field of Classification Search .......... 726/2–4, 726/10, 14–15, 20; 380/270, 277; 713/160–162, 713/168, 170–173, 189, 193–194
See application file for complete search history.

(56) References Cited

U.S. PATENT DOCUMENTS

| | | | |
|---|---|---|---|
| 5,485,455 A | 1/1996 | Dobbins et al. | 370/60 |
| 6,233,242 B1 | 5/2001 | Mayer et al. | 370/412 |
| 6,430,626 B1 | 8/2002 | Witkowski et al. | 709/249 |
| 7,046,647 B2 * | 5/2006 | Oba et al. | 370/331 |

* cited by examiner

*Primary Examiner*—Hosuk Song
(74) *Attorney, Agent, or Firm*—Hamilton & Terrile, LLP; Robert W. Holland

(57) ABSTRACT

Enhanced network security is provided through an intermediate network device, such as a switch or router, which stores in local memory a session key created based on session parameters. Subsequent attempts to communicate information through the session require authorization at the intermediate device by verification of the session key. For example, selected parameters from a protocol data unit are extracted to form a key, such as an IP address, MAC address, VLAN ID, socket number and application fields. Network accessible memory physically located in an infrastructure device provides an alternative repository for session-based information to enhance network communication security.

16 Claims, 3 Drawing Sheets

SYSTEM AND METHOD FOR SECURE INFORMATION HANDLING SYSTEM MEMORY

BACKGROUND OF THE INVENTION

1. Field of the Invention

The present invention relates in general to the field of information handling system memory, and more particularly to a system and method for secure information handling system memory.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increased reliance on information handling systems by individuals and businesses has increased the importance of ensuring ready and secure access to information. Often, end users access information located at secure sites, such as the end user's employer's network or other businesses like financial institutions, through non-secure networks, such as the Internet. Access of secure network sites through non-secure networks provides end users with tremendous convenience; however, it also provides information technology administrators with countless security problems. Enterprise networks are under constant attack from hackers who hope to penetrate security defenses to retrieve valuable enterprise information, perform malicious attacks on enterprise information handling systems or commit outright frauds on enterprise employees and customers. Each time hackers develop new techniques for attacking network security, information technology administrators respond with new security techniques, resulting in a cat-and-mouse game that has become quite expensive for both enterprises and individuals. The expense is often compounded by the complexity found in modern enterprise networks, which typically rely on multiple server information handling systems and storage systems interconnected by switches and routers.

One difficulty in maintaining a secure enterprise network environment is that networks have predictable architectures in which vulnerabilities occur at predictable and known weak spots. For example, information stores attached to a network are typically located in known locations, such as system memory attached to processors or disk storage arrays. These obvious and well-known locations often become the targets for unauthorized users to attack a network. For example, hackers sometimes attempt to "spoof" an information handling system by pretending to be another system that is authorized to retrieve information. By obtaining access to even a limited number of memory locations, a hacker can sometimes retrieve information that provides access to other locations, such as by retrieving passwords or other sensitive codes. Protecting each memory location presents a substantial logistical problem both in the identification of vulnerable locations and the updating of each location as hacker threats change. Further, as complexity is added to network security systems, the risk of down time or other interference with end user network access increases.

SUMMARY OF THE INVENTION

Therefore a need has arisen for a system and method which protects access to information handling system network memory locations.

In accordance with the present invention, a system and method are provided which substantially reduce the disadvantages and problems associated with previous methods and systems for protecting access to information handling system network memory locations. A key formulated from network session parameters is stored in local memory of an intermediary device located along they physical link between two end devices. A request to communicate across a session is authorized or denied by retrieval of the key from the local memory by reference to the parameters of the request.

More specifically, an information handling system network infrastructure, such as switches and routers, communicate information between information handling systems and storage devices. A session security engine on an intermediate infrastructure device located on the physical link between two end points stores a session key in local memory to track whether communications between end points are authorized. For example, the session key is an n-tuple of header information extracted from a protocol data unit associated with the network session, where an n-tuple is finite ordered list of n objects. An index saved in local memory of the intermediary device, such as in local memory of a switch, associates n-tuple values with network devices authorized to communicate information in a network session and restricts communication through the intermediary device to authorized information.

The present invention provides a number of important technical advantages. One example of an important technical advantage is that access to information handling system network memory locations is limited on a session-by-session basis by providing local memory at network switches that is accessed using an N-Tuple of session parameters. Defining storage that is accessible using transient session parameters of application sessions makes unauthorized access more difficult. For example, access to local switch memory is required to support information exchange through the switch between information handling systems coupled by the switch. Storing secure tokens in local switch memory helps to prevent spoofing of either end of a session supported along a physical link that includes the switch. Using the local switch memory to deposit a file for subsequent retrieval by another session allows security with an exchange of secure tokens for both synchronous and asynchronous sessions.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Information handling system network communication security is enhanced by applying session parameters at an intermediate device in the network infrastructure to store a session key that authorizes information communication. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
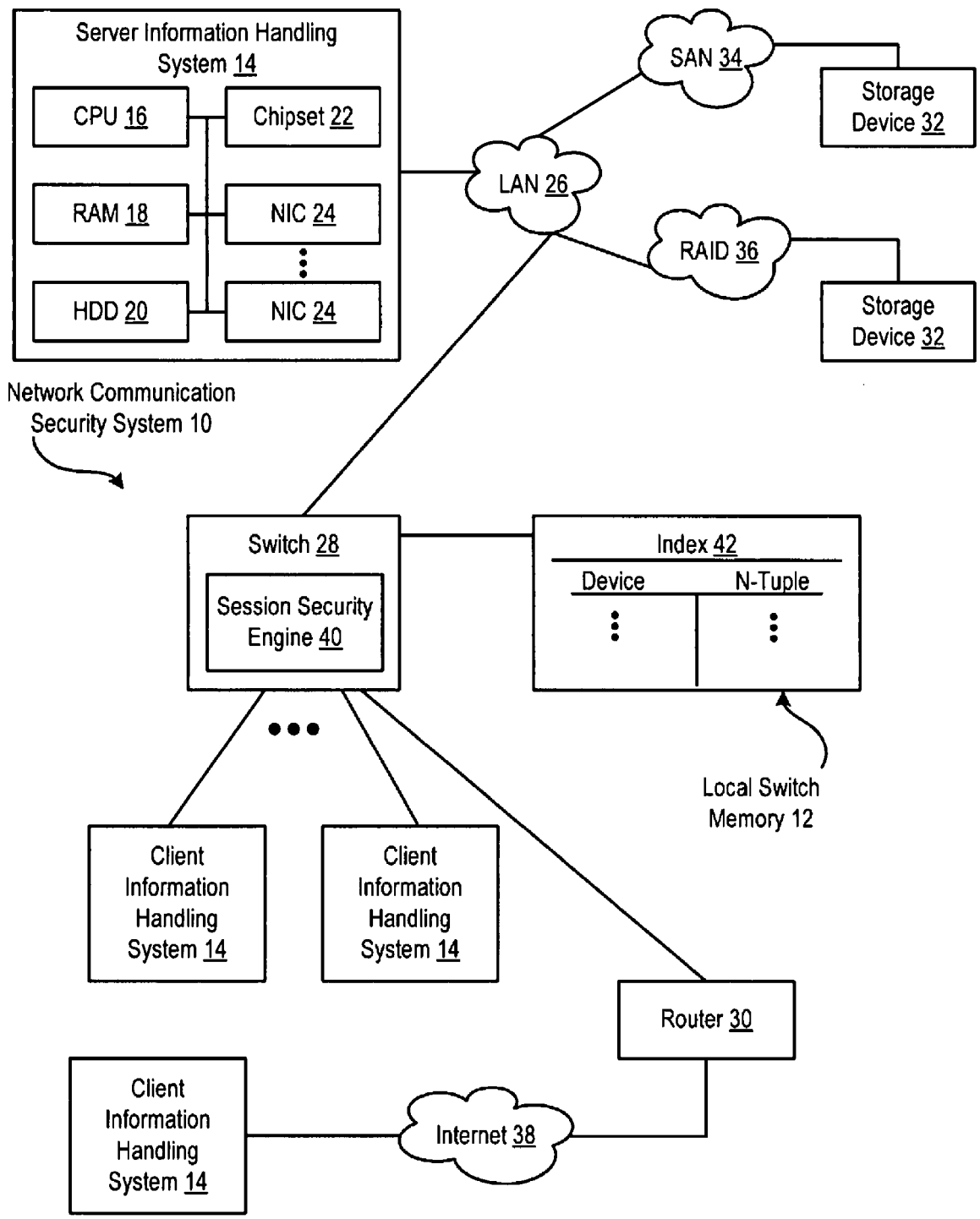
FIG. 1 depicts a block diagram of a network communication security system having security enhanced by network infrastructure memory that stores keys created from network session parameters.

Referring now to FIG. 1, a block diagram depicts a network communication security system 10 having security enhanced by network infrastructure memory 12 that stores keys created from network session parameters. Plural information handling systems 14, such as server systems and client systems, interface with each other through a network infrastructure that supports wired or wireless communication of information. Information handling systems 14 include plural processing components that cooperate to process information, such as a CPU 16, RAM, 18, a hard disk drive 20, a chipset 22 and network interface cards 24. Network communications is supported across a local area network 26 that includes an infrastructure of networking devices, such switches 28 and routers 30. A variety of storage devices 32 store information for access by information handling systems 14, such as devices interfaced through a storage area network (SAN) 34 or RAID configuration 36. In alternative embodiments, storage devices 32 include hard disk drives, optical drives, tape drives and other types of devices that store information. Access to information stored on storage devices 32 is selectively permitted to information handling systems by a variety of security devices, such as password protection, including information handling systems interfaced through Internet 38. In alternative embodiments, a variety of network configurations are available to communicate information, such as retrieval of information from storage devices 32 to information handling systems 14.

In order to enhance the security of network communications, a session security engine 40 runs on an intermediary device within the network infrastructure, such as on switch 40. Session security engine 40 supports storage of an index 42 in local memory 12 of the intermediary device that is accessible using transient parameters of application sessions that are valid for the duration of the sessions to increase the difficulty faced by an unauthorized user who seek to retrieve information from the network. For example, access to index 42 is keyed to any session n-tuple, meaning n number of things used to identify a network communication session, such as IP address, MAC address, VLAN ID, socket number, or application field session parameters. For instance, parameters within a protocol data unit (PDU) are retrieved at a session security engine 40 on initialization of a valid session and used as a key for establishing session-based validation in index 42. Subsequent searches of index 42 using programmatic tools or hardware tools, such as a content addressable memory, authorizes information exchanges of the session through the switch 28 that supports session security engine 40. Commands within the protocol data unit govern read and write memory operations based on authorization provided by session security engine 40. Index 42 thus becomes an alternative repository for session-based information that is physically located in network infrastructure devices to provide additional layers of security and an additional memory store in the network.

As one example, session security engine 40 provides memory as a mailbox for secure tokens that authorize network communications. Before information exchange is allowed on either side of a network link that goes through switch 28, session security engine 40 checks token left by the last transfer on the link to confirm an authorized exchange in accordance with an approved network session. The token is, for example stored by reference to the n-tuple of the session stored in index 42. By having a secure token in the middle of the physical link that carries a network session, spoofing of either end of the session is prevented. As each session is approved, selected statistical information regarding the nature of the link or the application that is feeding the link may be kept. The statistical information is stored in memory 12 for subsequent retrieval to support trending and diagnostics. Although the above example provides security for an established link until the session ends, in an alternative embodiment secure file storage in memory 12 is supported. For example, a session deposits a file in memory 12 for retrieval after the session ends by as subsequently initiated session, such as by the exchange of secure tokens through memory 12 by reference to the first session n-tuple. Thus, local memory 12 of switch 28 becomes a repository for not only synchronous sessions but also asynchronous sessions.

Figure 2:
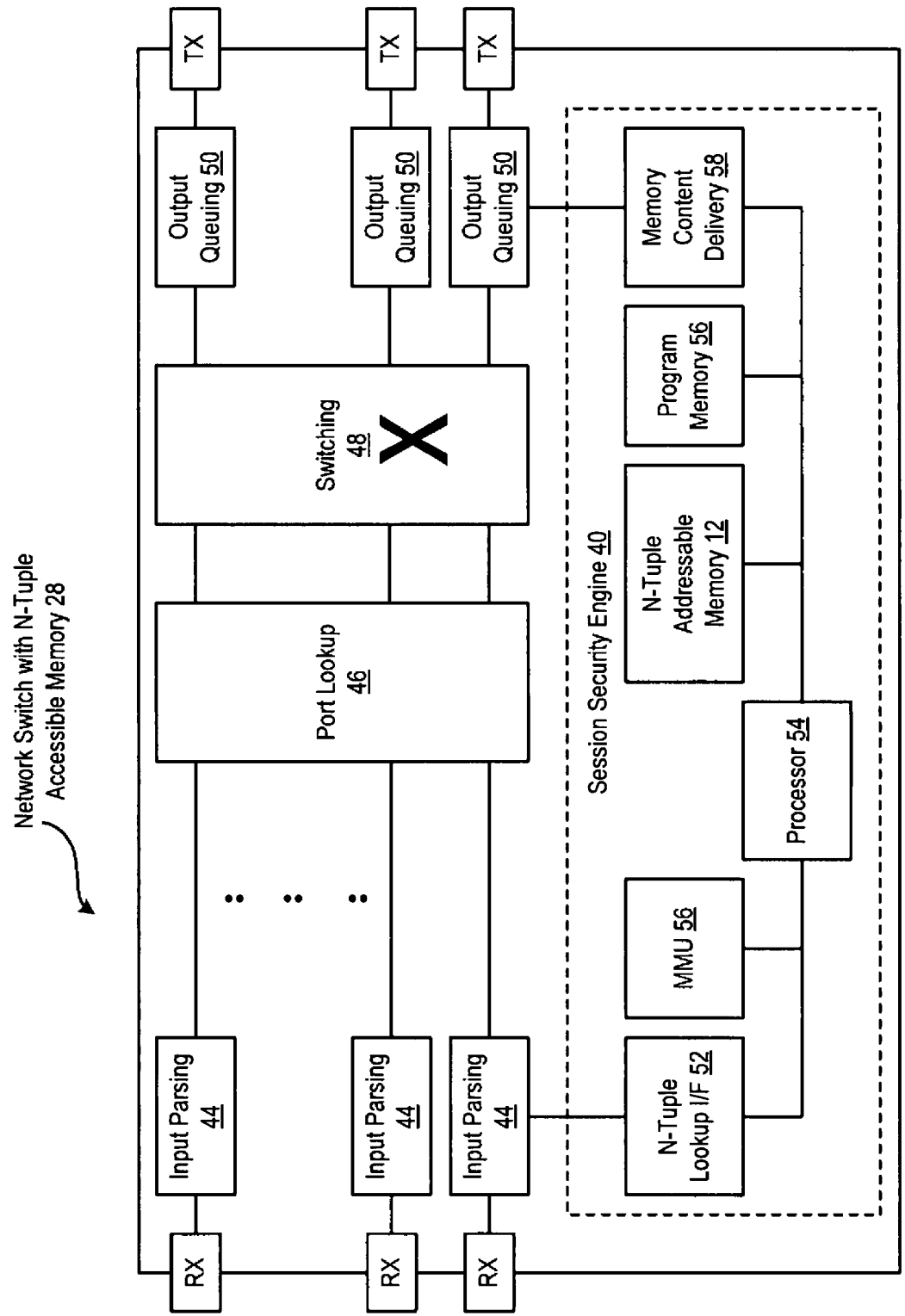
FIG. 2 depicts a block diagram of a network switch having a security session engine that enhances network communication security with memory local to the switch.

Referring now to FIG. 2, a block diagram depicts a network switch 28 having a security session engine 40 that enhances network communication security with memory 12 local to the switch. Incoming network communications arrive at input parsing module 44, proceed to port lookup module 46 and switching module 48 for communication to a desired destination at output queuing module 50. Upon receipt of a communication at input parsing module 44, an n-tuple lookup interface retrieves session parameters, such as from a protocol data unit, to determine if the communication is authorized. A processor 54 receives the session parameters and applies the session parameters with a memory management unit 56 (MMU) to lookup a session key using an n-tuple of the session parameters from an n-tuple addressable memory 12. For example, processor 54 runs firmware held in program memory 56 to determine if a session is authorized, and, if so, to deliver the appropriate token at a memory content delivery interface 58. Delivery of an authorized token from content delivery interface 58 allows communication of associated information within the session through the appropriate output queuing module 50.

Figure 3:
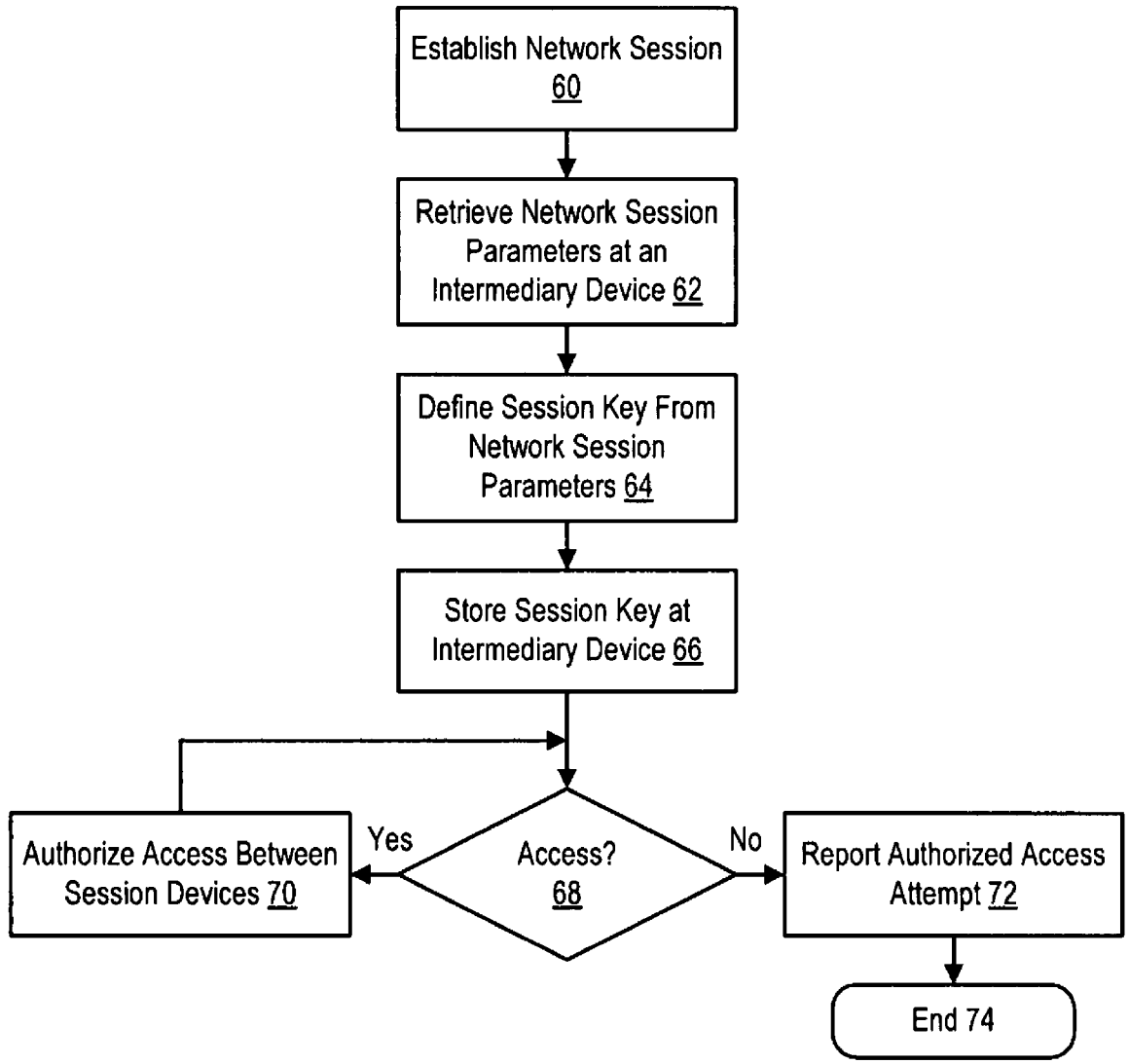
FIG. 3 depicts a flow diagram of a process for enhancing network communication security with a session-based parameter key.

Referring now to FIG. 3, a flow diagram depicts a process for enhancing network communication security with a session-based parameter key. The process begins at step 60 with the establishment of a network session, such as by an authorized security system using password protection. At step 62, network session parameters for the authorized session are retrieved at an intermediary device, such as retrieval of protocol data unit header information at a switch located on the physical link between an information handling system and storage device. At step 64, a session key is defined from network session parameters, such as by selection or predetermined parameters for placement in a predetermined order. If each end device has the selected parameters and order, such as a common encryption algorithm, then each end device can create the session key at its own location. At step 66, the session key is stored at the intermediary device. At step 68, access to a session is requested by an end device, such as a request to retrieve information, and compared with the session key to determine if the access is authorized. If the access is authorized, the process continues to step 70 to allow communication between the end devices. If the access is not authorized, the process continues to step 72 to report the attempted unauthorized access attempt and continues to step 74 to end the network session.

Although the present invention has been described in detail, it should be understood that various changes, substitutions and alterations can be made hereto without departing from the spirit and scope of the invention as defined by the appended claims.

What is claimed is:

1. A system for communicating information through a network, the system comprising:
    one or more information handling systems interfaced through a network, the information handling systems operable to communicate information across the network by reference to predetermined session parameters;
    one or more storage devices interfaced with the network, the storage devices operable to store information and to communicate with the information handling systems by reference to the predetermined session parameters;
    an intermediate device disposed between the information handling systems and storage devices, the intermediate device having local memory; and
    a session security engine associated with the intermediary device, the session security engine operable to apply the predetermined session parameters to define a key, to store the key in the intermediary device memory and to restrict communications through the network that fail to match the key stored in the intermediary device memory;
    wherein the predetermined session parameters comprise selected of plural packet header values having a predetermined arrangement.

2. The system of claim 1 wherein the intermediary device comprises a switch.

3. The system of claim 1 wherein the intermediary device comprises a router.

4. The system of claim 1 wherein the predetermined session parameters comprise parameters within a protocol data unit.

5. The system of claim 1 wherein the protocol data unit parameters comprise an IP address.

6. The system of claim 1 wherein the protocol data unit parameters comprise a MAC address.

7. The system of claim 1 wherein the protocol data unit parameters comprise a VLAN ID.

8. The system of claim 1 wherein the protocol data unit parameters comprise a socket number.

9. The system of claim 1 wherein the protocol data unit parameters comprise an application field.

10. A method for maintaining secure communications across a network, the method comprising:
    establishing a network session between plural network devices with predetermined session parameters;
    storing the session parameters at an intermediary device between the plural network devices;
    defining a session key from the session parameters; and
    restricting communication of information between the plural network devices by reference to the session keys;
    wherein restricting communication further comprises:
    storing a file at the intermediary device by reference to the session key;
    storing the session key at one or more of the plural network devices;
    ending the session between the plural network devices; and
    retrieving the file from the intermediary device to one or more of the plural network devices after ending the session by providing the token from the network device to the intermediary device.

11. The method of claim 10 further comprising storing session statistical information at the intermediary device.

12. The method of claim 10 wherein the intermediary device comprises a switch.

13. The method of claim 10 wherein the predetermined session parameters comprise selected of plural parameters of a protocol data unit communicated between the plural network devices.

14. A network session security engine comprising:
    a session lookup interface operable to retrieve session parameters from incoming information;
    a session processor operable to apply the session parameters to generate a session key;
    a session addressable memory operable to store the session key; and
    a content interface operable to authorize communication of information associated with a session key;
    wherein the session parameters comprise selected of plural packet header values having a predetermined arrangement.

15. The network session security engine of claim 14 wherein the packet header values comprise one or more of an IP address, a MAC address, a VLAN ID, a socket number and application fields.

16. The network session security engine of claim 14 wherein the session processor comprises a content addressable memory.

* * * * *